United States Patent
Lim et al.

(10) Patent No.: US 11,346,516 B2
(45) Date of Patent: May 31, 2022

(54) LIGHT EMITTING MODULE FOR VEHICLE AND LAMP DEVICE INCLUDING THE SAME

(71) Applicants: HYUNDAI MOTOR COMPANY, Seoul (KR); KIA MOTORS CORPORATION, Seoul (KR)

(72) Inventors: Jung Wook Lim, Seoul (KR); Byoung Suk Ahn, Gwacheon-si (KR); Seung Sik Han, Hwaseong-si (KR); Sung Ho Park, Seoul (KR); Ki Hong Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/191,086

(22) Filed: Mar. 3, 2021

(65) Prior Publication Data

US 2022/0107068 A1     Apr. 7, 2022

(30) Foreign Application Priority Data

Oct. 6, 2020   (KR) .......................... 10-2020-0128949

(51) Int. Cl.
- *F21S 41/275* (2018.01)
- *G02B 19/00* (2006.01)
- *F21V 5/04* (2006.01)

(52) U.S. Cl.
CPC ............ *F21S 41/275* (2018.01); *F21V 5/045* (2013.01); *G02B 19/0009* (2013.01); *G02B 19/0047* (2013.01)

(58) Field of Classification Search
CPC ................................ F21S 41/24; F21S 41/275
See application file for complete search history.

(56) References Cited

U.S. PATENT DOCUMENTS

| | | | |
|---|---|---|---|
| 10,300,835 B2 * | 5/2019 | Mochizuki | F21S 43/239 |
| 10,302,277 B2 | 5/2019 | Song et al. | |
| 10,436,406 B2 * | 10/2019 | Okada | F21S 41/148 |
| 10,761,243 B1 * | 9/2020 | Wei | G02B 3/005 |
| 10,908,345 B2 * | 2/2021 | Vollmer | F21S 43/14 |
| 2005/0270791 A1 * | 12/2005 | Lee | F21S 41/153 362/517 |

(Continued)

FOREIGN PATENT DOCUMENTS

| | | |
|---|---|---|
| KR | 10-0803310 | 2/2008 |
| KR | 20180134498 A | 12/2018 |

*Primary Examiner* — Zheng Song
(74) *Attorney, Agent, or Firm* — Lempia Summerfield Katz LLC (57) ABSTRACT

A light emitting module for a vehicle includes: a light source configured to generate light during an operation thereof; a condensing lens located on the front side of the light source in a direction in which the light generated by the light source travels, and configured to change a travel direction of input light; and a multi-facet lens located on the front side of the condensing lens in the direction in which the light generated by the light source travels, and comprising a rear surface to which the light that passed through the condensing lens is input through a rear surface thereof and a plurality of sections, wherein protruding heights of front surfaces of the plurality of sections are different.

14 Claims, 7 Drawing Sheets

(56) References Cited

U.S. PATENT DOCUMENTS

| | | | |
|---|---|---|---|
| 2015/0078029 A1* | 3/2015 | Kumar | F21S 41/143 |
| | | | 362/522 |
| 2015/0377453 A1* | 12/2015 | Ji | F21S 41/321 |
| | | | 362/607 |
| 2017/0219178 A1* | 8/2017 | Faffelberger | F21S 43/243 |
| 2017/0336041 A1* | 11/2017 | Mochizuki | G02B 6/0078 |
| 2017/0336050 A1* | 11/2017 | Lee | F21V 7/0083 |
| 2018/0356066 A1 | 12/2018 | Song et al. | |
| 2019/0093847 A1* | 3/2019 | Okada | F21S 41/148 |
| 2019/0154228 A1* | 5/2019 | Xiang | F21S 41/192 |
| 2019/0186708 A1* | 6/2019 | Ecker-Endl | F21S 41/321 |

\* cited by examiner

Center of vehicle

FIG. 6

Center of vehicle

LIGHT EMITTING MODULE FOR VEHICLE AND LAMP DEVICE INCLUDING THE SAME

CROSS REFERENCE TO RELATED APPLICATION

The present application claims priority to and the benefit of Korean Patent Application No. 10-2020-0128949, filed on Oct. 6, 2020, the entire contents of which are incorporated herein by reference.

FIELD

The present disclosure relates to a light emitting module for a vehicle and a lamp device including the same.

BACKGROUND

The statements in this section merely provide background information related to the present disclosure and may not constitute prior art.

A lamp for a vehicle refers to a lamp configured to emit light forwards such that the vehicle can travel safely. Vehicle lamps include headlamps, rear lamps, and the like. Headlamps include high-beam lights, low-beam lights, turn signal indicators, position lamps, and other components.

The design of such headlamps has been considered crucial to determining the vehicle design characteristics, and a technology for implementing slim headlamps that provide uniform lighting has become important.

Figure 1:
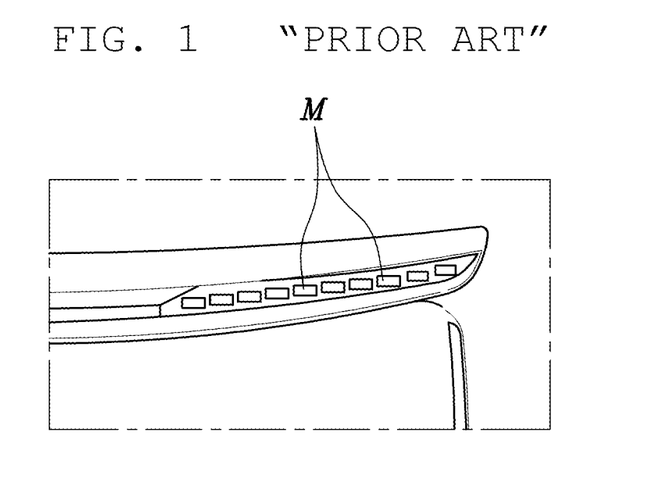
FIGS. 1 and 2 illustrate a lamp device for a vehicle according to the related art.
Figure 2:
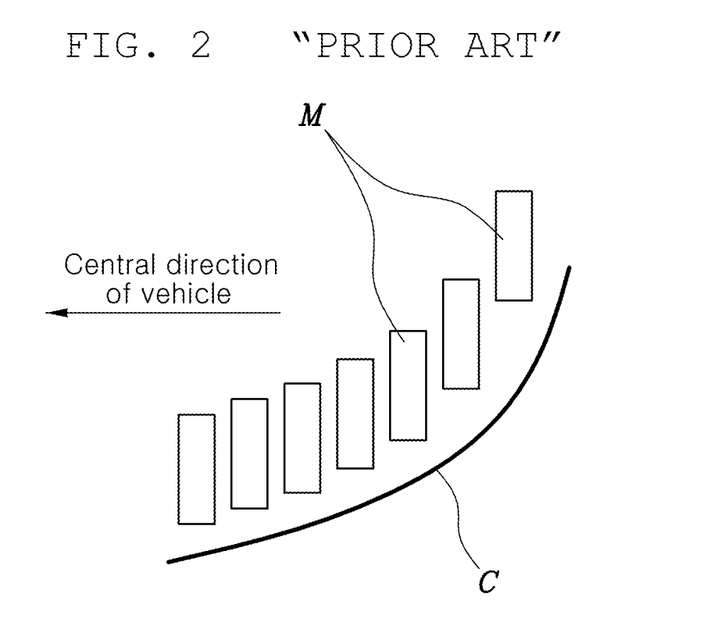

FIG. 1 and FIG. 2 illustrate a vehicle lamp device according to the prior art.

Referring to FIG. 1 and FIG. 2, the vehicle lamp device according to the prior art includes multiple light emitting modules M. Particularly, the multiple light emitting modules M are arranged in the forward/backward direction and leftward/rightward direction of the vehicle, and are disposed to be spaced apart from each other in the leftward/rightward direction.

However, we have discovered that a lamp device including multiple light emitting lamps M cases discontinuity because lighting areas that emit light are separated from each other due to the case and the distance of spacing. Covering the light emitting module with a lens that scatters or diffuses light in order to counterbalance the discontinuity may not be applied to a low-beam headlamp having an out-off shape.

The above description regarding the background art is only for helping understanding of the background of the present disclosure, and is not to be regarded by a person skilled in the art as corresponding to already-known prior arts.

SUMMARY

A light emitting module for a vehicle according to the present disclosure includes: a light source configured to generate light during an operation thereof; a condensing lens located on the front side of the light source in a direction in which the light generated by the light source travels, and configured to change a travel direction of input light; and a multi-facet lens located on the front side of the condensing lens in the direction in which the light generated by the light source travels, and comprising a rear surface to which the light that passed through the condensing lens is input through and a plurality of sections, wherein protruding heights of front surfaces of the plurality of sections are different.

The plurality of sections of the multi-facet lens may sequentially protrude to the front side along the leftward/rightward direction or the upward/downward direction of the vehicle.

Respective lighting areas according to the plurality of sections of the multi-facet lens may be different.

The plurality of sections of the multi-facet lens may protrude higher to the front side as they go to the inner side along the leftward/rightward direction of the vehicle.

The plurality of sections of the multi-facet lens may protrude lower to the front side as they go to the outer side along the leftward/rightward direction of the vehicle.

The plurality of sections of the multi-facet lens may be stepped from adjacent sections in the forward/rearward direction.

The plurality of sections of the multi-facet lens may be disposed to face parallel directions.

The light emitting module may further include a housing partially surrounding an outer surface of the multi-facet lens, and the multi-facet lens may be expanded from the front side of the housing to the outer side to cover a front surface of the housing from the front side.

The housing may be disposed to overlap a housing of an adjacent light emitting module in the leftward/rightward direction partially or as a whole, and may be disposed to be spaced apart from the housing of the adjacent light emitting module in the forward/rearward direction.

The housing may be formed of a bezel of a transparent material, through which the light passes.

The condensing lens may cause the light generated by the light source to travel in parallel or to be refracted such that the light is concentrated.

The condensing lens may totally reflect the input light on an inner surface thereof, and may be integrated with the multi-facet lens as a single body.

A lamp device for a vehicle according to the present disclosure is a lamp device including a light emitting module for a vehicle, wherein a plurality of light emitting modules are provided, and the plurality of light emitting modules are disposed in the leftward/rightward direction of the vehicle.

The multi-facet lens in the light emitting module may be spaced apart from a multi-facet lens of an adjacent module in the forward/rearward direction.

The multi-facet lens of the light emitting module may be disposed to protrude further to the relatively front side than a light emitting module disposed on the relatively outer side along the leftward/rightward direction of the vehicle.

The plurality of sections of the multi-facet lens of the light emitting module may protrude further to the relatively front side than a plurality of sections of a multi-facet lens of a light emitting module disposed on the relatively outer side along the leftward/rightward direction of the vehicle.

Steps between the plurality of sections of the multi-facet lens of the light emitting module may be smaller than steps between a plurality of sections of a multi-facet lens of a light emitting module disposed on the relatively outer side along the leftward/rightward direction of the vehicle.

A light emitting module for a vehicle and a lamp device including the same, according to the present disclosure, are advantageous in that continuity regarding lighting areas of light emitting modules is improved, and discontinuity occurring between multiple light emitting modules forming the lamp device is accordingly reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Various changes and modifications may be made to the forms according to the present disclosure, and therefore particular forms will be illustrated in the drawings and described in the specification or application. However, it should be understood that forms according to the concept of the present disclosure are not limited to the particular disclosed forms, but the present disclosure includes all modifications, equivalents, and alternatives falling within the spirit and scope of the present disclosure.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used in the present disclosure are merely used to describe specific forms, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary forms of the present disclosure will be described in detail with reference to the accompanying drawings. The same or like reference signs presented in the drawings designate the same or like elements.

Figure 3:
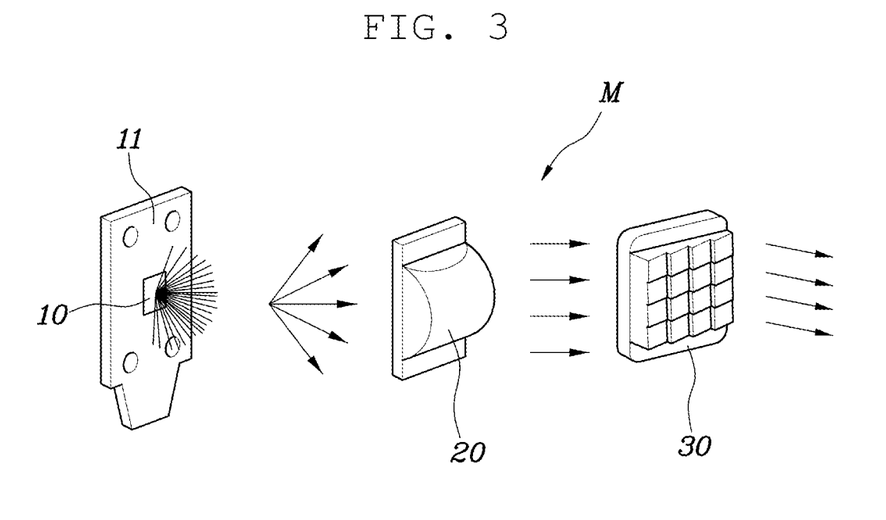
FIG. 3 illustrates an exploded perspective view of a light emitting module for a vehicle according to one form of the present disclosure.
Figure 4:
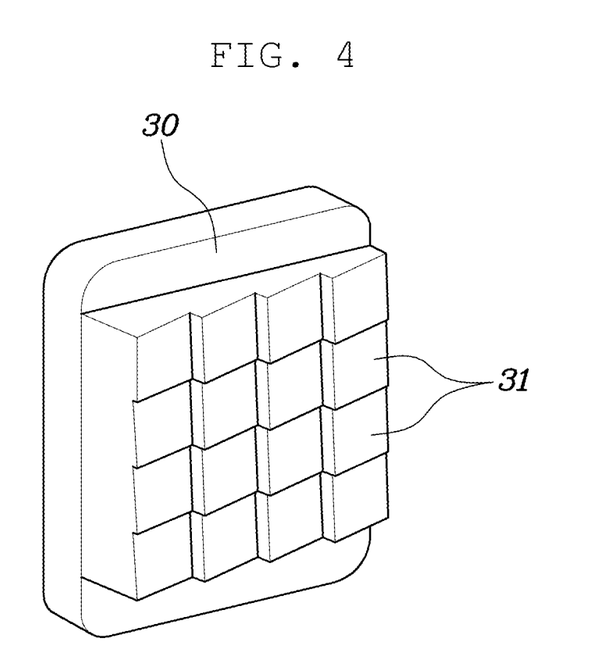
FIG. 4 illustrates a perspective view of a multi-facet lens according to one form of the present disclosure.

FIG. 3 illustrates an exploded perspective view of a light emitting module M for a vehicle according to one form of the present disclosure. FIG. 4 illustrates a perspective view of a multi-facet lens 30 according to one form of the present disclosure.

Referring to FIGS. 3 and 4, a light emitting module M for a vehicle according to one form of the present disclosure includes: a light source 10 configured to generate light during an operation thereof; a condensing lens 20 located on the front side of the light source 10 in a direction in which the light generated by the light source 10 travels, and configured to change the travel direction of the input light; and a multi-facet lens 30 located on the front side of the condensing lens 20 in the direction in which the light generated by the light source 10 travels, to which the light that passed through the condensing lens 20 is input through a rear surface thereof, and including a plurality of sections 31, in which the protruding heights of front surfaces thereof are different.

The light source 10 may include a light emitting diode (LED) or an organic light emitting diode (OLED). In addition, the light source 10 may be an LED array module (LAM).

The light source 10 may be coupled to a substrate 11 that controls various current supplies. For example, the substrate may be a PCB substrate, but the present disclosure is not limited thereto.

The light source 10 may generate light at a specific point, and may generate light in various directions. The generation direction and the travel direction of the light generated by the light source 10 refer to a direction corresponding to an effective irradiation range of the light source 10, and may be a reverse direction to a direction, in which the light is shielded by the substrate and the like.

In particular, when the light emitting module M for a vehicle according to one form of the present disclosure is mounted on a vehicle, the light source 10 may generate light toward the front side of the vehicle or cause the light to travel to the front side of the vehicle.

The condensing lens 20 may be located on the front side of the light source 10, and may cause the light input to the rear side to travel by reflecting the light. In particular, the condensing lens 20 may change the travel direction of the light generated by the light source 10. In particular, the condensing lens 20 may guide the light generated by the first light source 10 such that the light is condensed.

Here, the concept that light is condensed means that the travel direction of the light is changed to a direction in which the light is condensed to a focus. The case in which the light that travels in a dispersing direction travels in parallel also pertains to the case that the light is changed to a direction in which the light is condensed.

The multi-facet lens (MFL) 30 is located on the front side of the condensing lens 20, and the light generated by the light source 10, which is made to travel in parallel by the condensing lens 20, may be refracted to a specific direction. The light that passed through the multi-facet lens 30 may travel to a preset lighting area.

The light that travels after passing through the condensing lens 20 located on the rear side of the multi-facet lens 30 may be input through a rear surface of the condensing lens 20, and may travel through a front surface of the condensing lens 20.

In detail, the multi-facet lens 30 may include a plurality of sections 31 on the front surface thereof. In particular, the protruding heights of the plurality of sections 31 may be different. That is, a section 31 included in the multi-facet lens 30 may be located to protrude to the front side of an adjacent section 31, or to be recessed to the rear side of the adjacent section 31.

Figure 5:
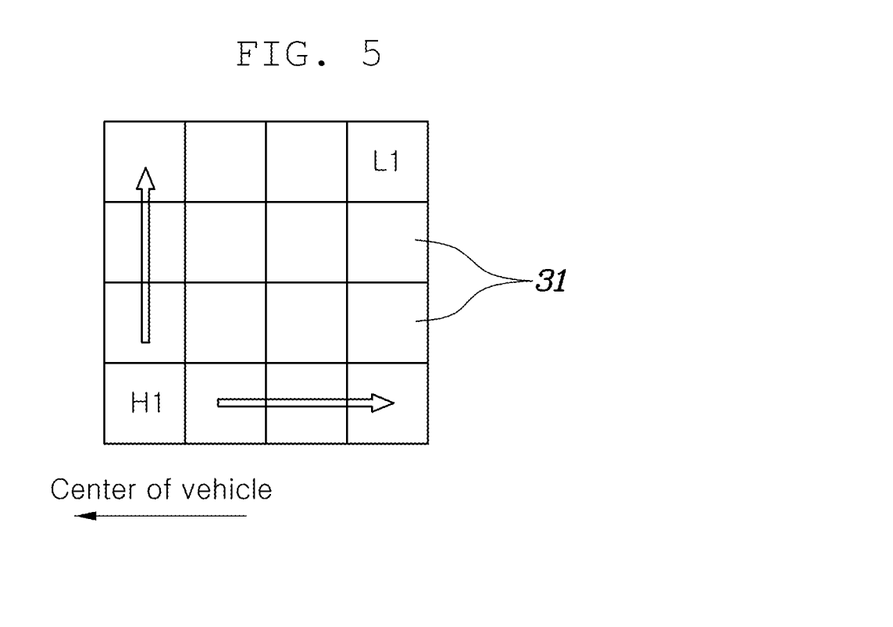
FIGS. 5 and 6 illustrate front plan views of a multi-facet lens according to various forms of the present disclosure.
Figure 6:
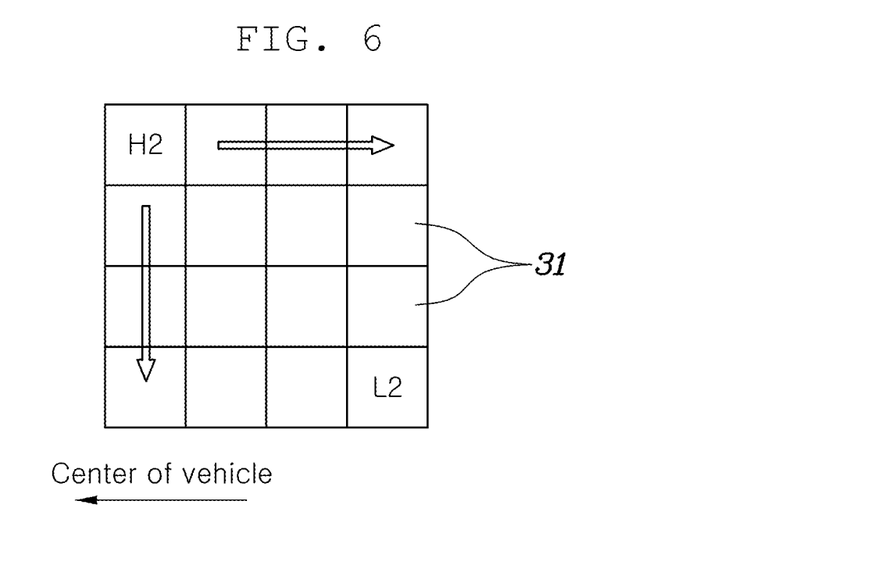

FIGS. 5 and 6 illustrate front plan views of a multi-facet lens 30 according to various forms of the present disclosure.

Referring to FIGS. 5 and 6 further, the plurality of sections 31 of the multi-facet lens 30 sequentially protrude to the front side along the leftward/rightward direction or the upward/downward direction of the vehicle.

In detail, in the multi-facet lens 30, a plurality of sections 31 may be arranged in the upward/downward direction or the leftward/rightward direction. The plurality of sections 31 of the multi-facet lens 30 may sequentially protrude to the front side as they go to the left side or the right side along the leftward/rightward direction or may sequentially protrude to the front side as they go to the upper side or the lower side along the upward/downward direction.

As illustrated in FIG. 5, the plurality of sections 31 of the multi-facet lens 30 may sequentially protrude to the front side as they go to the center direction and the lower side along the leftward/rightward direction of the vehicle. In particular, the section 31_H1 located in the center direction and at a lower corner of the vehicle may protrude to the foremost side, and the section 31_L1 located in the outward direction and at an upper corner of the vehicle may be recessed to the rearmost side.

Further, as illustrated in FIG. 6, the plurality of sections 31 of the multi-facet lens 30 may sequentially protrude to the front side as they go to the center direction and the upper side along the leftward/rightward direction of the vehicle. In particular, the section 31_H2 located in the central direction and the upper corner of the vehicle may protrude to the foremost side, and the section 31_L2 located in the outward direction and at the lower corner of the vehicle may be recessed to the rearmost side.

The lighting areas according to the plurality of sections 31 of the multi-facet lens 30 may be different.

The light input to the rear surface of the multi-facet lens 30 travels through the plurality of sections forming the front surface to define light emitting areas, and the lighting areas may be areas that are different in the leftward/rightward direction or the upward/downward direction. Portions of the lighting areas may overlap each other.

The plurality of sections 31 of the multi-facet lens 30 may protrude higher to the front side as they go to the inner side along the leftward/rightward direction of the vehicle.

The plurality of sections 31 of the multi-facet lens 30 may protrude lower to the front side as they go to the outer side along the leftward/rightward direction of the vehicle.

In detail, the plurality of sections 31 of the multi-facet lens 30 may protrude gradually further to the front side as they go to the central direction of the vehicle along the leftward/rightward direction of the vehicle. The arrangement may be made along an outer periphery C of a headlamp for a vehicle.

The plurality of sections 31 of the multi-facet lens 30 may be stepped in the forward/rearward direction from the adjacent sections 31.

That is, the sections 31 of the multi-facet lens 30 are not continuous to the adjacent sections 31 in the leftward/rightward direction or the upward/downward direction, and may be stepped from each other in the forward/rearward direction.

As one form, the plurality of sections 31 of the multi-facet lens 30 may be disposed to face parallel directions.

In particular, the plurality of sections 31 may be disposed to face parallel directions in a state in which they are cut in a crossing direction, and accordingly, the light that travels through the plurality of sections 31 may also travel in parallel directions.

As another form, some of the plurality of sections 31 of the multi-facet lens 30 may be disposed to face different directions. Accordingly, the intensity of the light for the lighting areas of the light emitting module M may be uniformly set by causing the light to travel in various directions to disperse the light.

Figure 7:
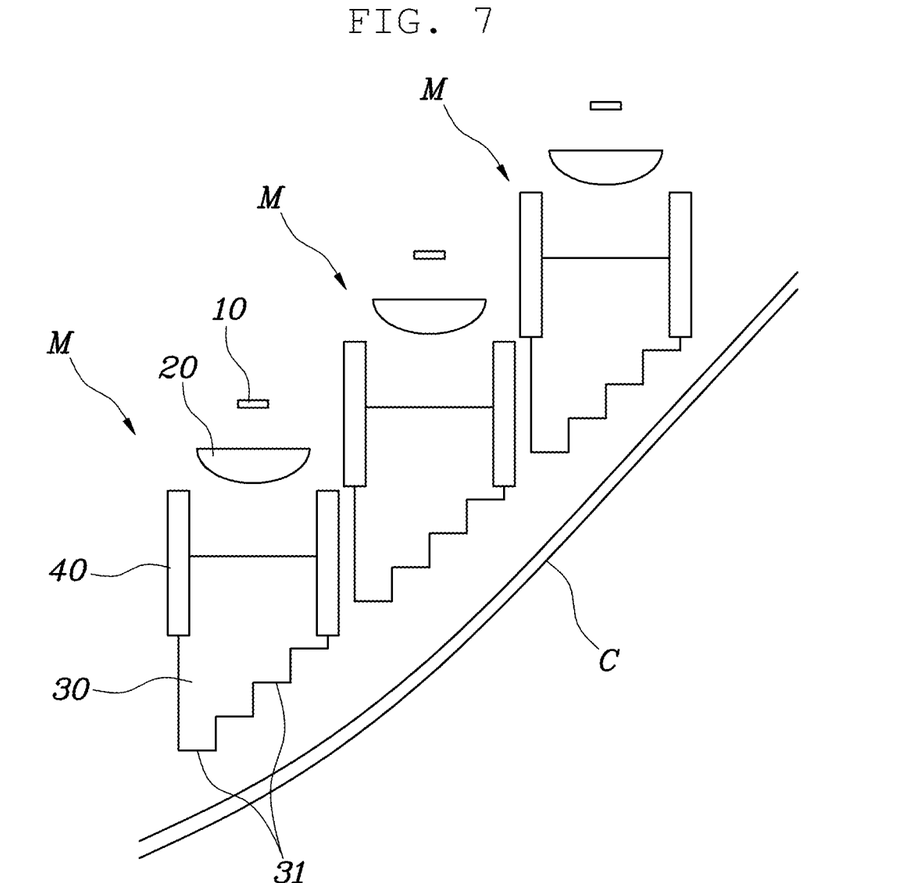
FIG. 7 illustrates a diagram of a light emitting module for a vehicle and a lamp device including the same according to one form of the present disclosure.

FIG. 7 illustrates a diagram of a light emitting module M for a vehicle and a lamp device including the same according to one form of the present disclosure.

Referring to FIG. 7 further, the light emitting module may further include a housing partially surrounding an outer surface of the multi-facet lens 30, wherein the multi-facet lens 30 may be expanded from the front side of the housing 40 to the outer side to cover a front surface of the housing 40 from the front side.

The housing 40 may partially surround the outer surface of the multi-facet lens 30, and may surround the light source 10 and the condensing lens 20 from the outside. In particular, the housing 40 may surround portions of the left side surface and the right side surface of the multi-facet lens 30 from the outside.

In particular, the housing 40 may surround the outer surface of the multi-facet lens 30 at a rear end of the multi-facet lens 30, and an outer surface of a front end of the multi-facet lens 30 may be exposed to the outside of the housing 40. The front end of the multi-facet lens 30 may be expanded to the outer side, and accordingly, when viewed from the front side, the multi-facet lens 30 may be expanded to the front side of the front surface of the housing 40.

Accordingly, an interval between adjacent light emitting modules M, which is caused by the thickness of the housing 40 (a bezel) can be minimized.

Furthermore, the housing 40 may be disposed such that a portion or an entire area of the housing 40 overlap the housing of an adjacent light emitting module M in the leftward/rightward direction, and may be disposed to be spaced apart from the housing of the adjacent light emitting module M in the forward/rearward direction.

Accordingly, the continuity of the light emitting surface can be improved by improving a shading portion disposed between the adjacent light emitting modules M.

In addition, the housing 40 may be formed of a bezel of a transparent material, through which light passes. Accordingly, the continuity of the light emitting surface can be improved by improving a shading portion disposed between the adjacent light emitting modules M.

The condensing lens 20 may refract the light generated by the light source 10 such that the light travels in parallel or is condensed.

In one form, the condensing lens 20 may be a projection lens, one side or opposite sides of which protrude convexly or a Fresnel lens compressed in a planar direction.

In another form, the condensing lens 20 may be a total reflection (total internal reflection: TIR) lens that totally reflects the light input to the inner side on an inner side surface thereof.

Figure 8:
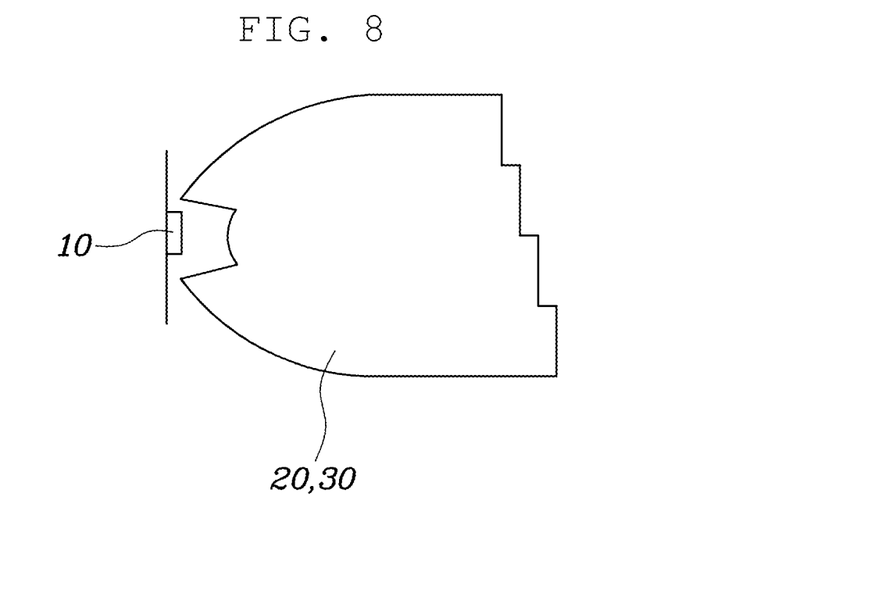
FIGS. 8 and 9 illustrate an integrated lens, in which a condensing lens and a multi-facet lens are integrated with each other, according to one form of the present disclosure.
Figure 9:
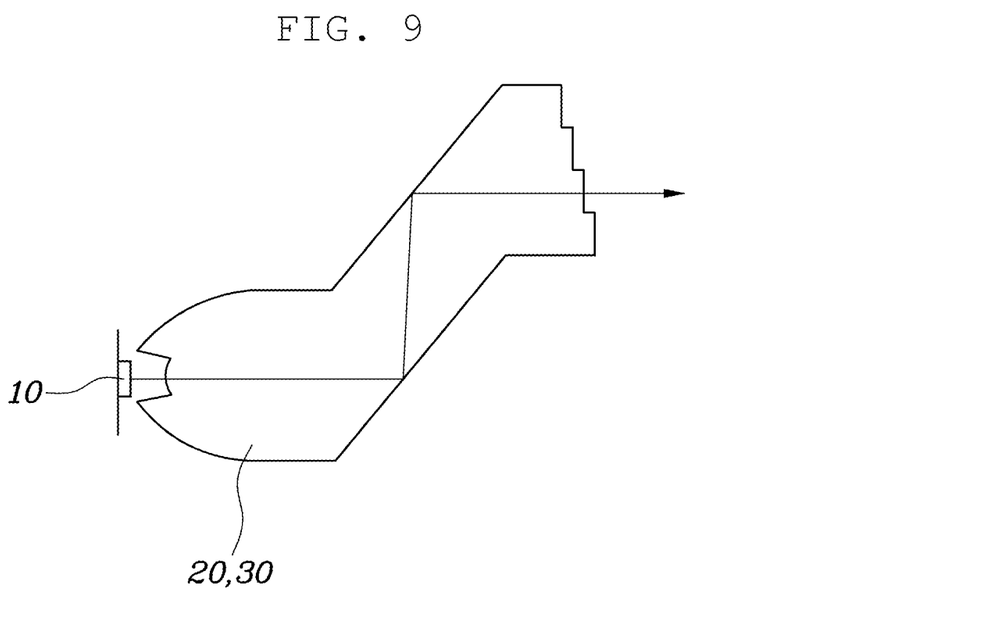

FIGS. 8 and 9 illustrate an integrated lens 20, 30, in which a condensing lens 20 and a multi-facet lens 30 are integrated with each other, according to one form of the present disclosure.

Referring to FIGS. 8 and 9, the condensing lens 20 may totally reflect the input light from the inner surface thereof, and may be integrated with the multi-facet lens 30 as a single body.

A rear end of the integrated lens 20, 30 may be a condensing lens 20 that totally reflects the light input to the inside to cause the light to travel to the front side. The light that passed through the rear end of the integrated lens 20, 30 may be parallel light that travels in parallel directions.

A front end of the integrated lens 20, 30 may be a multi-facet lens 30 including a plurality of sections 31.

As illustrated in FIG. 9, the integrated lens 20, 30 may totally reflects the light input to the inside to inner side surface thereof to change the travel direction of the light.

Figure 10:
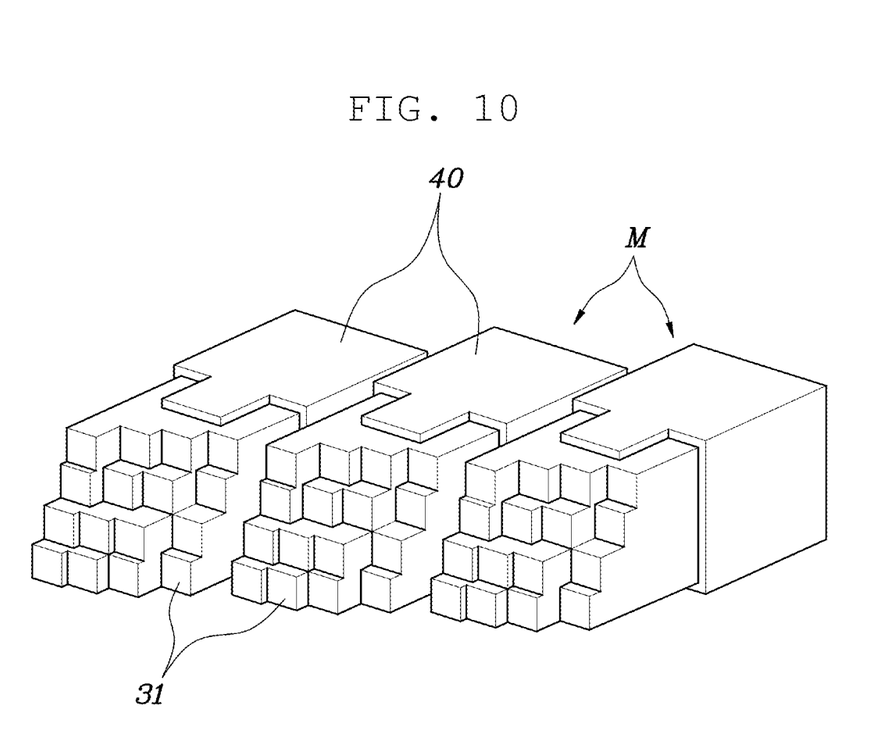
FIG. 10 illustrates a perspective view of a lamp device for a vehicle according to one form of the present disclosure.
Figure 11:
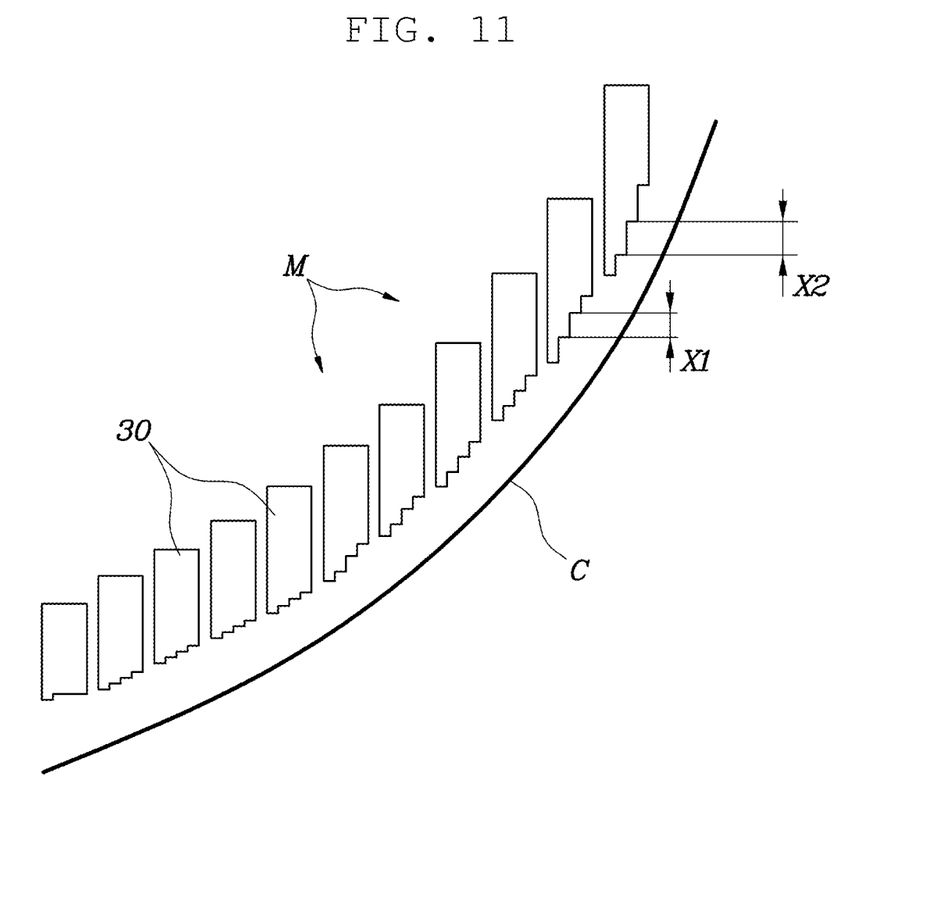
FIG. 11 illustrates a diagram of a lamp device for a vehicle according to one form of the present disclosure.

FIG. 10 illustrates a perspective view of a lamp device for a vehicle according to one form of the present disclosure. FIG. 11 illustrates a diagram of a lamp device for a vehicle according to one form of the present disclosure.

Referring to FIGS. 10 and 11, the lamp device for a vehicle according to one form of the present disclosure may be provided a plurality of light emitting modules M, and the plurality of light emitting modules M may be disposed along the leftward/rightward direction of the vehicle.

In detail, a multi-facet lens 30 of a light emitting module M may be spaced apart from a multi-facet lens 30 of an adjacent light emitting module M in the forward/rearward direction.

The multi-facet lens 30 of the light emitting module M may protrude to the front side further than a multi-facet lens 30 of a light emitting module M disposed on the outer side along the leftward/rightward direction of the vehicle. To the contrary, the multi-facet lens 30 of the light emitting module M may be disposed on the rear side of a multi-facet lens 30 of the light emitting module M that is adjacent in the central direction of the vehicle to be recessed relatively.

That is, the plurality of light emitting modules M and the multi-facet lenses 30 included therein may be recessed to the rear side as they go to the outer side along the leftward/rightward direction of the vehicle, and may be disposed to protrude to the front side as they go to the central direction of the vehicle.

Further, the plurality of sections 31 of the multi-facet lens 30 included in the light emitting module M may protrude further than the plurality of sections 31 of the multi-facet lens 30 included in the light emitting module M disposed on the relatively outer side along the leftward/rightward direction of the vehicle.

The plurality of sections 31 of the multi-facet lens 30 may be disposed to be spaced apart from each other in the forward/rearward direction. In particular, the section 31 of the multi-facet lens 30 included in the light emitting module M may protrude to the front side as it goes in the central direction along the leftward/rightward direction of the vehicle.

Meanwhile, among the plurality of sections 31 of the multi-facet lens 3 of the light emitting module M, the section 31 protruding lowest to the front side may be disposed to the front side further than, among the plurality of sections 31 of the multi-facet lens 30 of the light emitting module M disposed on the outer side along the leftward/rightward direction of the vehicle, the section 31 protruding highest to the front side.

In addition, the plurality of sections 31 of the multi-facet lens 30 included in the light emitting module M may be disposed to be stepped in the forward/rearward direction of the vehicle. Furthermore, the steps of the plurality of light emitting modules M, which are disposed between the plurality of sections 31 of the multi-facet lens 30, may be different.

In one form, the plurality of steps X1 between the plurality of sections 31 of the multi-facet lens 30 included in the light emitting module M may be smaller than the steps X2 between the plurality of sections 31 of the multi-facet lens 30 included in the light emitting module M disposed on the relatively outer side along the leftward/rightward direction of the vehicle.

In detail, the plurality of light emitting modules M may be arranged along the leftward/rightward direction of the vehicle and may be disposed on the rear side as they go to the outer side of the vehicle, and particularly, the spacing distances between the adjacent light emitting modules M in the forward/rearward direction may increase as they go to the outer side of the vehicle.

Further, because the spacing distances between the adjacent light emitting modules M in the forward/rearward direction increase as they go to the outer side, the steps X1 and X2 between the plurality of sections 31 of the multi-facet lens 30 of the light emitting module M may also gradually increase.

Additionally, a total sum of the steps disposed between, among the plurality of sections 31 of the multi-facet lens 30 of the light emitting module M, the sections 31 arranged in the leftward/rightward direction may be smaller than the entire height of the multi-facet lens 30 in the forward/rearward direction.

Further, a total sum of the steps disposed between, among the plurality of sections 31 of the multi-facet lens 30 of the light emitting module M, the sections 31 arranged in the leftward/rightward direction may be smaller than the height difference between the corresponding light emitting module M and the adjacent light emitting module M in the forward/rearward direction.

Although the present disclosure has been described and illustrated in conjunction with particular forms thereof, it will be apparent to those skilled in the art that various improvements and modifications may be made to the present disclosure without departing from the technical idea of the present disclosure defined by the appended claims.

What is claimed is:

1. A light emitting module for a vehicle, the light emitting module comprising:
 a light source configured to generate light;
 a condensing lens located on a front side of the light source in a direction in which the light generated by the light source travels, and configured to change a travel direction of the light;
 a multi-facet lens located on a front side of the condensing lens in the direction in which the light generated by the light source travels; and
 a housing partially surrounding an outer surface of the multi-facet lens,
 wherein the multi-facet lens comprise a rear surface to which the light that passed through the condensing lens is input through; and a plurality of sections having front surfaces protruding with different heights,
 wherein the multi-facet lens is expanded from a front side of the housing to an outer side, and covers a front surface of the housing from a front side,
 wherein the housing is configured to overlap a housing of an adjacent light emitting module in a first lateral direction partially or as a whole, and is configured to be spaced apart from the housing of the adjacent light emitting module in a second lateral direction, and
 wherein the first lateral direction is either leftward or rightward, and the second lateral direction is either forward or rearward.

2. The light emitting module of claim 1, wherein the plurality of sections sequentially protrude to a front side along a first lateral direction or a vertical direction of the vehicle, and
 wherein the first lateral direction is either leftward or rightward, and the vertical direction is either upward or downward.

3. The light emitting module of claim 1, wherein respective lighting areas of each section of the plurality of sections are different.

4. The light emitting module of claim 1, wherein the plurality of sections protrude higher to a front side as the plurality of sections go to an inner side along a first lateral direction of the vehicle, and
 wherein the first lateral direction is either leftward or rightward.

5. The light emitting module of claim 1, wherein the plurality of sections protrude lower to a front side as the plurality of sections go to an outer side along a first lateral direction of the vehicle, and
 wherein the first lateral direction is either leftward or rightward.

6. The light emitting module of claim 1, wherein each section of the plurality of sections is stepped from adjacent sections in a second lateral direction, and
 wherein the second lateral direction is either forward or rearward.

7. The light emitting module of claim 1, wherein the plurality of sections are configured to face parallel directions.

8. The light emitting module of claim 1, wherein the housing is formed of a bezel of a transparent material through which the light passes.

9. The light emitting module of claim 1, wherein the condensing lens is configured to direct the light generated by the light source to travel in parallel or to be refracted such that the light is concentrated.

10. The light emitting module of claim 1, wherein the condensing lens totally reflects the input light on an inner surface thereof, and is integrated with the multi-facet lens as a single body.

11. A lamp device for a vehicle, the lamp device comprising a plurality of light emitting modules disposed in a first lateral direction of the vehicle, wherein each light emitting module of the plurality of light emitting modules includes:
 a light source configured to generate light during an operation thereof;
 a condensing lens located on a front side of the light source in a direction in which the light generated by the light source travels, and configured to change a travel direction of input light; and
 a multi-facet lens located on a front side of the condensing lens in the direction in which the light generated by the light source travels, and comprising a rear surface to which the light that passed through the condensing lens is input through and a plurality of sections,
 wherein protruding heights of front surfaces of the plurality of sections are different,
 the first lateral direction is either leftward or rightward,
 wherein a multi-facet lens of a first light emitting module is disposed to protrude further to a relatively front side than a second light emitting module disposed on a relatively outer side along the first lateral direction of the vehicle, and
 wherein a plurality of sections of the multi-facet lens of the first light emitting module protrude further to a relatively front side than a plurality of sections of a multi-facet lens of the second light emitting module.

12. The lamp device of claim 11, wherein a multi-facet lens in a first light emitting module is spaced apart from a multi-facet lens of an adjacent module in a second lateral direction,
 wherein the second lateral direction is either forward or rearward.

13. The lamp device of claim 11, wherein the each light emitting module further comprises: a housing partially surrounding an outer surface of the multi-facet lens,
 wherein housings of the plurality of light emitting modules are disposed adjacent to each other in the first lateral direction of the vehicle and are disposed to overlap each other in the first lateral direction partially or as a whole, and housings of adjacent light emitting modules are spaced apart from each other in a second lateral direction, and
 wherein the second lateral direction is either forward or rearward.

14. A lamp device for a vehicle, the lamp device comprising a plurality of light emitting modules disposed in a first lateral direction of the vehicle, wherein each light emitting module of the plurality of light emitting modules includes:
 a light source configured to generate light during an operation thereof;
 a condensing lens located on a front side of the light source in a direction in which the light generated by the light source travels, and configured to change a travel direction of input light; and
 a multi-facet lens located on a front side of the condensing lens in the direction in which the light generated by the light source travels, and comprising a rear surface to which the light that passed through the condensing lens is input through and a plurality of sections, wherein protruding heights of front surfaces of the plurality of sections are different, the first lateral direction is either leftward or rightward, wherein a multi-facet lens of a first light emitting module is disposed to protrude further to a relatively front side than a second light emitting module disposed on a relatively outer side along the first lateral direction of the vehicle, and wherein steps between a plurality of sections of the multi-facet lens of the first light emitting module are smaller than steps between a plurality of sections of a multi-facet lens of the second light emitting module.

* * * * *